Dec. 10, 1940.　　　　　S. REY　　　　　2,224,745
LENS
Filed June 22, 1939
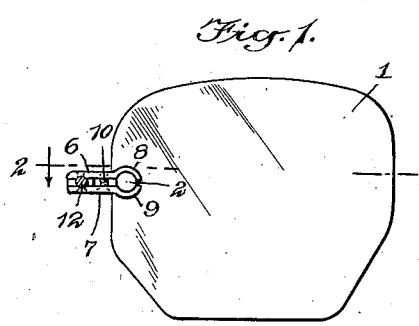
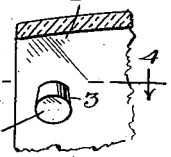
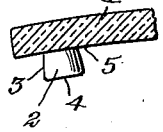
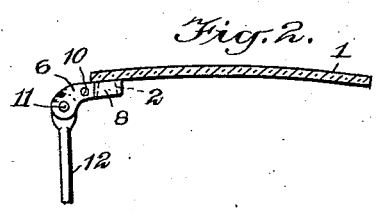
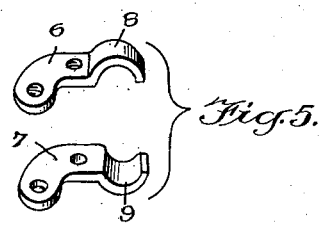
WITNESSES
INVENTOR
Stephen Rey
BY
ATTORNEYS

UNITED STATES PATENT OFFICE 2,224,745

LENS

Stephen Rey, Brooklyn, N. Y., assignor to Zylo Ware Corporation, New York, N. Y., a corporation of New York Application June 22, 1939, Serial No. 280,437

1 Claim. (Cl. 88—47)

This invention relates to lenses for spectacles and eyeglasses and has for an object to provide an improved construction wherein a lug or protuberance may be provided at any desired point around the lens for the reception of a mounting.

Another object of the invention is to provide a lens having a protuberance which may be integral therewith, welded in place, or cemented in place, and positioned to receive mountings associated with temples or a nose piece.

In the accompanying drawing—

Fig. 1 is an elevation of a lens with a protuberance and part of a mounting associated therewith;

Fig. 2 is a sectional view through Fig. 1 approximately on the line 2—2;

Fig. 3 is an enlarged fragmentary perspective view of the protuberance and associated parts shown in Fig. 1;

Fig. 4 is a sectional view through Fig. 3 approximately on the line 4—4;

Fig. 5 is a perspective view of the clamping members of the temple mounting shown in Figs. 1 and 2.

Referring to the accompanying drawing, by numerals, 1 indicates a lens which may be of any desired kind or shape and which is provided with one or more lugs or protuberances 2. The lug or protuberance 2, as shown in the drawing, is formed of glass and is welded to the lens 1. The welding operation consists preferably in heating one end of the lug 2 until it is molten and then pressing the molten surface against the lens where it adheres and quickly cools. At the time of adherence it merges into the lens 1 so as to be substantially integral therewith, though actually welded thereto. If desired, cement could be used though the welding operation is considered better practice. In forming the lug 2 the same is preferably tapered, as indicated at 3 in Fig. 4, the taper extending from the outer surface 4 to the surface 5 of lens 1. A pair of mounting clamps 6 and 7 are associated with the protuberance 2, as shown in Figs. 1 and 2. These clamps are provided with arc-shaped sections 8 and 9 that are shaped to fit against the side walls of the protuberance 2 and to be firmly clamped thereto by a suitable screw 10. A screw or bolt 11 is used to connect the temple 12 in place.

The desired form of lens is provided in the usual way and then the various mountings are secured thereto by other means than drilling a hole in the lens. It will be noted from the drawing that there are no holes provided in the lens and, consequently, there will be less likelihood of breaking of the lens during use thereof.

I claim:

A device of the character described comprising a glass lens having an integral upstanding protuberance adjacent one end extending normal to the rear surface of the lens, said protuberance converging from its outer end toward said rear surface and a mounting having a pair of encircling parts and means for clamping said parts to said protuberance so that the axis of said parts will be normal to the rear surface of the lens.

STEPHEN REY.